United States Patent [19]

Furukawa et al.

[11] Patent Number: 4,882,652
[45] Date of Patent: Nov. 21, 1989

[54] HIGH DIELECTRIC CONSTANT TYPE CERAMIC COMPOSITION

[75] Inventors: Osamu Furukawa, Sagamihara; Mitsuo Harata; Takaaki Yasumoto, both of Kawasaki; Motomasa Imai, Inagi, all of Japan

[73] Assignee: Kabushiki Kaisha Toshiba, Kawasaki, Japan

[21] Appl. No.: 115,908

[22] Filed: Nov. 2, 1987

Related U.S. Application Data

[63] Continuation-in-part of Ser. No. 791,060, Oct. 24, 1985, abandoned.

[30] Foreign Application Priority Data

Nov. 4, 1986 [JP] Japan .................................. 61-260814

[51] Int. Cl.$^4$ ............................................. C04B 35/46
[52] U.S. Cl. ....................................... 361/321; 501/136
[58] Field of Search ....................... 501/134, 135, 136; 361/320, 321

[56] References Cited

U.S. PATENT DOCUMENTS

| | | | |
|---|---|---|---|
| 4,265,668 | 5/1981 | Fujiwara et al. | 501/134 |
| 4,339,544 | 7/1982 | Sakabe et al. | 501/136 |
| 4,536,821 | 8/1985 | Wheeler et al. | 361/321 |
| 4,753,905 | 6/1988 | Nishioka et al. | 501/136 |

FOREIGN PATENT DOCUMENTS

| | | | |
|---|---|---|---|
| 103304 | 3/1984 | European Pat. Off. | 252/62.9 R |
| 57-25607 | 2/1982 | Japan | 501/134 |
| 57-188456 | 11/1982 | Japan | 501/134 |

Primary Examiner—Mark L. Bell
Attorney, Agent, or Firm—Foley & Lardner, Schwartz, Jeffery, Schwaab, Mack, Blumenthal & Evans

[57] ABSTRACT

When a portion of the Pb of a $Pb(Zn_{\frac{1}{3}}Nb_{\frac{2}{3}})O_3$-based ceramic composition within the region bounded by lines connecting a, b, c, d, e and f points in the ternary composition diagram of the accompanying FIG. 1 is substituted by a small amount of Ca, a high dielectric constant type ceramic composition is obtained which has a small temperature coefficient of dielectric constant and which is effective as a material for multilayer ceramic capacitors.

11 Claims, 1 Drawing Sheet

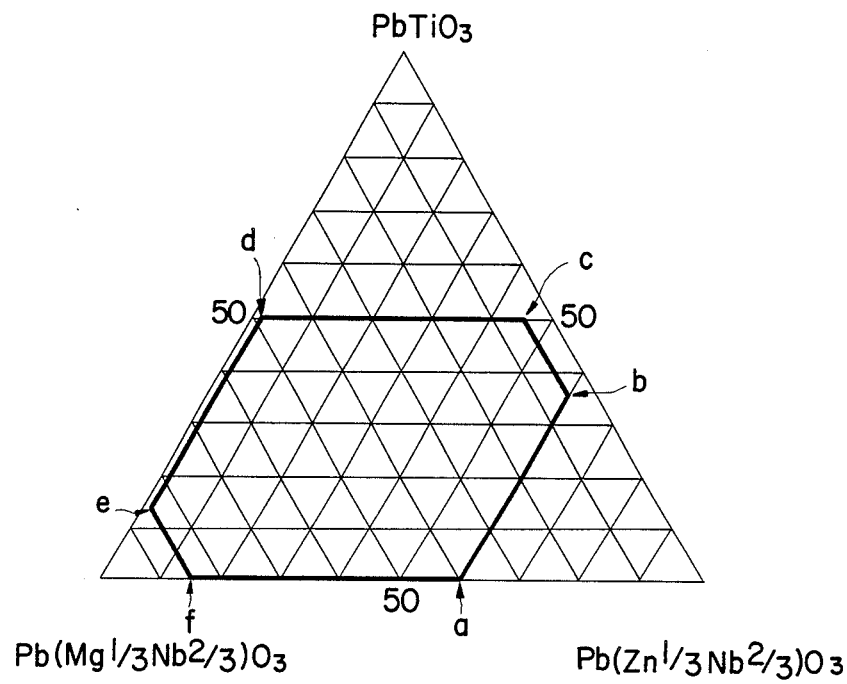
F I G. I

HIGH DIELECTRIC CONSTANT TYPE CERAMIC COMPOSITION

The present application is a continuation-in-part of U.S. application Ser. No. 791,060 filed Oct. 24, 1985, now abandoned.

BACKGROUND OF THE INVENTION

The present invention relates to high dielectric constant type ceramic compositions, and, in particular, to high dielectric constant type ceramic compositions which are capable of sintering at low temperatures, which have excellent electrical characteristics such as high insulation resistance and which are suitable for producing multilayer ceramic capacitors or the like. And this invention relates to multilayer ceramic capacitors produced by using such compositions as dielectrics.

Electrical characteristics which must be considered for dielectric materials include dielectric constant, temperature coefficient of dielectric constant (T.C.C.), dielectric loss, bias electric field dependence of dielectric constant, capacitance-resistance product and the like.

In particular, it is required that the capacitance-resistance product (CR product) be amply high. For example, Standards of Electronic Industries Association of Japan (EIAJ) stipulates, in the standards RC-3698B, entitled "Multilayer ceramic capacitors (chip-type) for electronic equipment", that the CR product be at least 500 M$\Omega\cdot\mu$F at room temperature. Further it is required to maintain the high CR product even at higher temperatures so that capacitors can be used under even more severe conditions. (For example, Military Specification MIL-C-55681B stipulates a CR product at 125° C.)

In the case of multilayer type elements, it is necessary to use internal electrode materials which can withstand even at the sintering temperatures of dielectric materials, because the electrode layers and the dielectric layers are co-fired. Accordingly, if the sintering temperatures of the ceramic dielectric materials are high, expensive precious metals such as platinum (Pt) or palladium (Pd) must be used as internal electrodes not to react mutually. Therefore, a requirement is that sintering be possible at lower temperatures of the order of 1100° C. or below so that inexpensive metal such as silver (Ag) based alloy can be used.

A conventional high dielectric constant type ceramic composition is a solid solution containing barium titanates (BaTiO$_3$) as the base materials and stannates, zirconates, titanates, etc. as additives. It is certainly possible to obtain a composition having a high dielectric constant, but such a composition has problems. If the dielectric constant becomes high, then T.C.C. becomes large. Further, the bias electric field dependence becomes large. Furthermore, since the sintering temperatures of the BaTiO$_3$-based materials are as high as 1,300° to 1,400° C., high-temperature resistant expensive precious metals such as platinum or palladium should be used for the internal electrode materials, thus resulting in cost augmentation.

In order to overcome the above mentioned problems of the BaTiO$_3$-based materials, extensive studies are being carried out on a variety of low-firing type compositions. For example, Japanese Patent Laid-Open Pub. No. 57204/1980 discloses a Pb(Fe$_\frac{1}{2}$Nb$_\frac{1}{2}$)O$_3$-based composition; Japanese Patent Laid-Open Pub. No. 51758/1980 discloses a Pb(Mg$_\frac{1}{3}$Nb$_\frac{2}{3}$)O$_3$-based composition; and Japanese Patent Laid-Open Pub. No. 21662/1977 discloses a Pb(Mg$_\frac{1}{2}$W$_\frac{1}{2}$)O$_3$-based composition.

The Pb(Fe$_\frac{1}{2}$Nb$_\frac{1}{2}$)O$_3$-based composition is accompanied by the following problems. The sintering temperature dependence of the CR product is quite large. Particularly, the decrease of the CR product at a higher temperature such as at 85° C. is large. The Pb(Mg$_\frac{1}{3}$Nb$_\frac{2}{3}$)O$_3$-based composition requires a relatively high sintering temperature. Further, the Pb(Mg$_\frac{1}{2}$W$_\frac{1}{2}$)O$_3$-based composition is accompanied by the following problems. If the CR product is large, then the dielectric constant is small. If the dielectric constant is large, then the CR product is small. Furthermore, the T.C.C. of these materials is superior to that of the barium titanate, but it is insufficient.

Further, Japanese Patent Laid-Open Pub. No. 121959/1980 discloses a composition comprising a solid solution of Pb(Mg$_\frac{1}{3}$Nb$_\frac{2}{3}$)O$_3$ and lead titanate wherein if necessary a portion of Pb, less than 10 mole %, is substituted by barium, strontium or calcium. However, the T.C.C. of this composition cannot be said to be sufficient, the T.C.C. of the best composition being $-59.8\%$ at a temperature range of from $-25°$ to 85° C. Further, Japanese Patent Laid-Open Pub. No. 121959/1980 mentioned above does not describe the CR product which is the most important property of a capacitor material, whereby the usefulness of this composition as a capacitor material is uncertain.

Still further, Japanese Patent Laid-Open Pub. No. 25607/1982 discloses a solid solution of Pb(Mg$_\frac{1}{3}$Nb$_\frac{2}{3}$)O$_3$ and Pb(Zn$_\frac{1}{3}$Nb$_\frac{2}{3}$)O$_3$. However, this publication describes neither the CR product nor the T.C.C. Thus, the usefulness of this material as a capacitor material is also uncertain.

An object of the present invention is therefore to provide a high dielectric constant type ceramic composition wherein the following problems of the prior art are overcome:

(1) the sintering temperature is high;
(2) when the dielectric constant is large, the CR product is small; and
(3) the CR product (insulation resistance) at high temperatures is small; wherein the dielectric constant and insulation resistance are high; wherein such a composition can be sintered at low temperatures; and wherein it has excellent electrical characteristics.

Another object of the present invention is to provide a multilayer ceramic capacitor produced through the use of such a composition.

SUMMARY OF THE INVENTION

The present invention is directed to a ceramic composition wherein a portion of Pb of a ternary diagram of lead zinc niobate (Pb(Zn$_\frac{1}{3}$Nb$_\frac{2}{3}$)O$_3$), lead magnesium niobate (Pb(Mg$_\frac{1}{3}$Nb$_\frac{2}{3}$)O$_3$) and lead titanate (PbTiO$_3$) is substituted by calcium, and more particularly to a high dielectric constant type ceramic composition, characterized in that when said composition is represented by the general formula:

$$xPb(Zn_\frac{1}{3}Nb_\frac{2}{3})O_3-$$

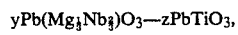

$$yPb(Mg_\frac{1}{3}Nb_\frac{2}{3})O_3-zPbTiO_3,$$

a portion of Pb of the composition within lines connecting the following points of the ternary composition diagram shown in the accompanying FIG. 1 having apexes of respective components, is substituted by from 2 to 30 mole % of calcium:

| | |
|---|---|
| a: | ($x = 0.60$, $y = 0.40$, $z = 0.00$) |
| b: | ($x = 0.60$, $y = 0.05$, $z = 0.35$) |
| c: | ($x = 0.45$, $y = 0.05$, $z = 0.50$) |
| d: | ($x = 0.01$, $y = 0.49$, $z = 0.50$) |
| e: | ($x = 0.01$, $y = 0.85$, $z = 0.14$) |
| f: | ($x = 0.15$, $y = 0.85$, $z = 0.00$) |

The present invention is directed to a high dielectric constant type ceramic composition wherein, when lead and calcium elements are represented by A, further, zinc, magnesium, niobium and titanium elements are represented by B, and the chemical formula of the complex compound is represented by $ABO_3$, the molar ratio of A to B is in the range shown in the following formula:

$$1.00 \leq A/B < 1.10$$

The present invention is directed to a high dielectric constant type ceramic composition which optionally further comprises at least one of manganese, cobalt, nickel and chromium additionally included therein in an amount of up to 1.0 mole % on the basis of MnO, CoO, NiO and $Cr_2O_3$.

The present invention is directed to a multilayer ceramic capacitor having at least a pair of internal electrodes and produced through the use of such compositions as dielectrics.

BRIEF DESCRIPTION OF THE DRAWING

In the drawing:

FIG. 1 is a ternary composition diagram indicating the compositional ranges of ceramic compositions according to this invention.

DETAILED DESCRIPTION OF THE INVENTION

The compositional ranges of the composition according to the present invention will now be described.

A ceramic composition according to the present invention is a high dielectric constant type ceramic composition, characterized in that when said composition is represented by the general formula

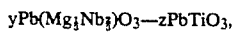

a portion of Pb of the composition within lines connecting the following points of the ternary composition diagram shown in the accompanying FIG. 1 having apexes of respective components, is substituted by from 2 to 30 mole % of calcium:

| | |
|---|---|
| a: | ($x = 0.60$, $y = 0.40$, $z = 0.00$) |
| b: | ($x = 0.60$, $y = 0.05$, $z = 0.35$) |
| c: | ($x = 0.45$, $y = 0.05$, $z = 0.50$) |
| d: | ($x = 0.01$, $y = 0.49$, $z = 0.50$) |
| e: | ($x = 0.01$, $y = 0.85$, $z = 0.14$) |
| f: | ($x = 0.15$, $y = 0.85$, $z = 0.00$) |

In a region (1) wherein the content of $Pb(Zn_{\frac{1}{3}}Nb_{\frac{2}{3}})O_3$ is more than line a-b, the dielectric constant is small (no more than 3,000) and the insulation resistance is small (no more than $10^{10} \Omega \cdot cm$ at 25° C.).

In a region (2) wherein the content of $Pb(Mg_{\frac{1}{3}}Nb_{\frac{2}{3}})O_3$ is less than line b-c, the dielectric constant is small (no more than 3,000) and the CR product at room temperature is no more than $1000 \Omega \cdot F$.

In a region (3) wherein the content of $PbTiO_3$ is more than line c-d, many pores are formed in the sintered bodies, satisfactory ceramics are not obtained, the insulation resistance is no more than $10^{10} \Omega \cdot cm$ and the CR product is extremely small.

In a region (4) wherein the content of $Pb(Zn_{\frac{1}{3}}Nb_{\frac{2}{3}})O_3$ is less than line d-e, the sintering temperature exceeds 1,100° C., and the insulation resistance is low.

In a region (5) wherein the content of $Pb(Mg_{\frac{1}{3}}Nb_{\frac{2}{3}})O_3$ is more than line e-f, the sintering temperature is high and the CR product is no more than 1,000 $\Omega \cdot F$.

When b is b'($x=0.6$, $y=0.2$, $z=0.2$) and c is c'($x=0.3$, $y=0.2$, and $z=0.5$), a region wherein the content of $Pb(Mg_{\frac{1}{3}}Nb_{\frac{2}{3}})O_3$ is more than line b'-c' is more preferable, and a ceramic composition having a dielectric constant of at least 5,000 is obtained.

When e is e'($x=0.01$, $y=0.8$, and $z=0.19$) and f is f'($x=0.5$, $y=0.5$, and $z=0$), a region wherein the content of $Pb(Mg_{\frac{1}{3}}Nb_{\frac{2}{3}})O_3$ is less than line e'-f' is more preferable, and there is obtained a ceramic composition wherein the CR product is at least 1,000 even at high temperatures.

The temperature dependence of dielectric constant is largely influenced by the Curie temperature (Tc). However, when a portion of Pb of a composition within the a-b-c-d-e-f region is substituted by Ca, the variation is inhibited within the range of from +22% to -56% at a temperature range of from -30° C. to +85° as compared with that at room temperature. Thus, characteristics satisfying the U.S. Specification EIAY5U can be obtained.

The amount of Ca by which Pb is substituted is from 2 mole% to 30 mole%. If the amount of Ca is less than 2 mole%, the sintering temperature will exceed 1,100° C., and the CR product will be less than 1,000 $\Omega \cdot F$. If the amount of Ca is more than 30 mole%, many pores will be formed in sintered bodies, the insulation resistance will be less than $10^{10}$ $\Omega \cdot cm$ and the CR product will be extremely reduced. Accordingly, the amount of Ca by which Pb is substituted is to be from 2 to 30 mole%.

In a preferred ceramic composition of the present invention, when Pb and Ca elements are represented by A, further, Zn, Mg, Nb and Ti elements are represented by B, and the chemical formula of the complex compound is represented by $ABO_3$, the molar ratio of A to B is $1.00 \leq A/B < 1.10$. If the molar ratio is less than 1.00, the dielectric constant will be reduced and the dielectric loss will exceed 1.5%. Thus, the molar ratio of less than 1.00 is impractical.

The molar ratio of more than 1.10 is undesirable because the insulation resistance begins to decrease. Accordingly, the molar ratio of A to B is to be in the range of $1.00 \leq A/B < 1.10$. When Pb is substituted by Ba or Sr rather than Ca, the molar ratio of A to B of more than 1.00 reduces the dielectric constant as opposed to Ca substitution. It is believed that this shows that the substitution of Pb by Ca cannot be dealt in the same manner as in the case of Ba or Sr substitution. However, the reasons why Ca substitution is different from Ba or Sr substitution are not entirely apparent.

The ceramic composition of the present invention is based on the complex compound represented by the general formula described above. This composition is shown on the basis of oxides as follows:

| | | |
|---|---|---|
| PbO | 55.15–72.27 | wt % |
| ZnO | 0.08–5.91 | wt % |
| MgO | 0.20–4.20 | wt % |
| $Nb_2O_5$ | 13.60–31.27 | wt % |
| $TiO_2$ | 0.00–15.12 | wt % |
| CaO | 0.34–6.57 | wt % |

Impurities, additives, substituents and the like may be contained without impairing the effects of the present invention. For example, in addition to MnO, CoO, NiO and $Cr_2O_3$ already stated, $Sb_2O_3$, $ZrO_2$, $La_2O_3$ or the like can be used. The content of such additives is about 1% by weight at most.

Processes for producing the present composition will be described hereinafter.

Oxides of Pb, Ca, Zn, Nb, Ti and Mg, or precursors which are converted into oxides during the sintering step, for example salts such as carbonates and oxalates, hydroxides, and organic compounds are used as starting materials and weighed in a predetermined proportion. They are thoroughly mixed and then calcined. This calcination is carried out at a temperature of from about 700° to about 850° C. If the calcination temperature is too low, the density of sintered bodies will be reduced. If the calcination temperature is too high, the density of the sintered bodies will be reduced and the insulation resistance will decrease. The calcined material is then pulverized to produce powder. It is preferable that the average grain size of the powder be from about 0.8 to 2 micrometers. If the average grain size is too large, pores present in the sintered bodies will be increased. If the average grain size is too small, then easiness of forming will be reduced. Such a calcined and pulverized powder is used and formed into a desired shape. Thereafter, the formed product is sintered to obtain high dielectric constant type ceramics. The sintering can be carried out at a relatively low temperature of 1,100° C. or below, preferably from about 900° to about 1,050° C. by using the composition of the present invention.

When elements of multilayer type are produced, the following procedure can be used. A binder, a solvent and the like are added to the powder described above to prepare a slurry. The slurry is formed into green sheets, and internal electrodes are printed on the green sheets. Thereafter, the predetermined number of green sheets are laminated, pressed and sintered to produce the elements. Since the dielectric material of the present invention can be sintered at a low temperature, inexpensive metals such as Ag-based materials can be used as the internal electrodes.

The present compositions can be sintered at a relatively low temperature of 1,100° C. or below, preferably from 900° to 1,050° C. The present compositions have stable and excellent electrical characteristics as follows:

| | |
|---|---|
| Dielectric constant | 3,000 (25° C.) or above |
| Dielectric loss | 2.0% or below |
| CR product | 2,000 Ω · F (25° C.) or above |
| CR product | 500 Ω · F (125° C.) or above |
| Insulation resistance | $10^{12}$ Ω · cm or above |
| Temperature dependence | +22% through −56% |
| of dielectric constant | (at −30° C. through +85° C.) |

The present compositions have an excellent direct-current bias voltage dependence, for example, of within 45% under 1 KV/mm, and excellent mechanical strength. Further, the present compositions are effective as materials for multilayer capacitor wherein internal electrodes and dielectric layers are laminated and cofired, because the present compositions can be sintered at a temperature as low as 900°–1,050° C. In this case, low melting metals such as Ag, Cu, Ni or Al, which are relatively inexpensive as compared with Pd or Pt, can be used as materials from which internal electrodes are produced. The use of such materials contributes to reduction in cost. Further, even if the present compositions are used in infinitesimal displacement elements which utilize piezoelectric/electrostrictive effects, the change of characteristics due to temperatures is little.

Since the present compositions can be sintered at a low temperature as described above, they are also effective as paste materials for thick film dielectrics which are to be printed on circuit substrates or the like and sintered. In this case, even if the partial pressure of oxygen is lowered, the fundamental characteristics are not reduced and therefore the present compositions are useful. The incorporation of at least one of manganese, cobalt, nickel and chromium into such compositions at a level of up to 1 mole % on the basis of their oxides can reduce the dielectric loss and improve their sinterability, and thus good characteristics can be obtained. If the amount of such metals is more than 1 mole %, the insulation resistance will be reduced and the dielectric loss will be increased. Thus, the maximum content of such metals is 1 mole %.

As stated hereinbefore, according to the present invention, high dielectric constant type ceramic compositions which have high dielectric constant and insulation resistances, can be sintered at low temperatures, and have excellent electrical characteristics can be obtained. Further, according to the present invention, excellent multilayer ceramic capacitors produced by using such ceramic compositions can be obtained.

The following non-limiting examples are set forth to illustrate the present invention more fully.

EXAMPLES 1 to 12

Starting materials such as oxides of Pb, Ca, Zn, Nb, Ti and Mg were mixed by means of a ball mill or the like. The mixtures were calcined at a temperature of from 700° to 850° C. The calcined materials were then milled by means of the ball mill or the like and dried to prepare powder. A binder was added to the powder. The mixtures were granulated and pressed to form disk-like specimens each having a diameter of 17 mm and a thickness of about 2 mm. In order to prevent contamination of impurities, it is preferable that balls having high values of hardness and toughness such as partially stabilized zirconia balls be used as the balls for mixing/milling.

These formed specimens were sintered for 2 hours in air at a temperature of from 900° to 1,050° C., and silver electrodes were printed on the main surfaces of the sintered specimens to measure dielectric electrical properties. Their dielectric loss and capacitance were measured by using a digital LCR meter under 1 KHz and 1

Vrms at 25° C. Their dielectric constant was calculated from the data of size of the specimen and capacitance measured. Further, their insulation resistance values were calculated from the data measured by applying a voltage of 100 V for 2 minutes by using an insulation resistance meter. The temperature coefficient of capacitance was determined by using a value at 25° C. as a standard and examining the percent change at −30° C. and standard and examining the percent change at −30° C. and 85° C., respectively. Capacitance-resistance product was determined from (dielectric constant) x (insulation resistance) x (dielectric constant in vacuo) at 25° C. and 125° C., respectively. The measurement of insulation resistance was carried out in silicone oil in order to exclude the effect of moisture in air. The results are shown in Table 1.

TABLE 1

| | Composition (mole) | | | | PbO (wt %) | CaO (wt %) | ZnO (wt %) | MgO (wt %) | Nb$_2$O$_5$ (wt %) | TiO$_2$ (wt %) | Dielectric Constant K25° C. | Dielectric Loss DF (%) | Insulation Resistance ρ25° C. (Ω·cm) | CR Product 25° C. (Ω·F) | CR Product 125° C. (Ω·F) | Temperature Coefficient of Capacitance (%) | |
|---|---|---|---|---|---|---|---|---|---|---|---|---|---|---|---|---|---|
| | x | y | z | a | | | | | | | | | | | | −30° C. | +85° C. |
| Exam. | | | | | | | | | | | | | | | | | |
| 1 | 0.54 | 0.44 | 0.02 | 0.075 | 64.59 | 1.32 | 4.58 | 1.85 | 27.16 | 0.50 | 5,400 | 0.8 | 8.0 × 10$^{12}$ | 3,800 | 1,060 | −53 | −41 |
| 2 | 0.5 | 0.3 | 0.2 | 0.16 | 62.30 | 2.98 | 4.51 | 1.34 | 23.56 | 5.31 | 5,600 | 0.7 | 1.7 × 10$^{13}$ | 8,400 | 2,400 | −52 | −39 |
| 3 | 0.5 | 0.1 | 0.4 | 0.26 | 59.03 | 5.21 | 4.85 | 0.48 | 19.00 | 11.42 | 3,100 | 0.7 | 1.6 × 10$^{13}$ | 4,400 | 1,300 | −52 | −36 |
| 4 | 0.34 | 0.33 | 0.33 | 0.20 | 61.75 | 3.88 | 3.19 | 1.53 | 20.53 | 9.12 | 7,700 | 0.8 | 1.8 × 10$^{13}$ | 12,300 | 3,400 | −54 | −45 |
| 5 | 0.1 | 0.4 | 0.5 | 0.245 | 61.37 | 5.00 | 0.99 | 1.96 | 16.13 | 14.55 | 14,600 | 0.9 | 1.0 × 10$^{13}$ | 12,900 | 3,700 | −53 | −47 |
| 6 | 0.1 | 0.5 | 0.4 | 0.195 | 63.01 | 3.83 | 0.95 | 2.36 | 18.64 | 11.21 | 15,300 | 0.9 | 1.4 × 10$^{13}$ | 19,000 | 5,700 | −55 | −48 |
| 7 | 0.01 | 0.7 | 0.29 | 0.125 | 65.52 | 2.35 | 0.09 | 3.16 | 21.11 | 7.77 | 19,200 | 0.9 | 8.2 × 10$^{12}$ | 13,900 | 3,900 | −55 | −47 |
| 8 | 0.1 | 0.7 | 0.2 | 0.09 | 66.13 | 1.64 | 0.88 | 3.06 | 23.08 | 5.20 | 16,300 | 0.9 | 1.1 × 10$^{13}$ | 15,900 | 4,100 | −53 | −48 |
| 9 | 0.3 | 0.5 | 0.2 | 0.125 | 64.24 | 2.31 | 2.68 | 2.21 | 23.32 | 5.26 | 9,700 | 0.8 | 1.9 × 10$^{13}$ | 16,300 | 4,900 | −55 | −47 |
| 10 | 0.3 | 0.6 | 0.1 | 0.075 | 65.63 | 1.34 | 2.59 | 2.56 | 25.35 | 2.54 | 10,300 | 0.8 | 1.7 × 10$^{13}$ | 15,500 | 5,300 | −54 | −48 |
| 11 | 0.3 | 0.7 | 0 | 0.025 | 66.92 | 0.43 | 2.50 | 2.89 | 27.25 | 0.00 | 10,800 | 0.8 | 6.5 × 10$^{12}$ | 6,200 | 980 | −52 | −45 |
| 12 | 0.1 | 0.8 | 0.1 | 0.04 | 67.44 | 0.71 | 0.85 | 3.38 | 25.10 | 2.51 | 17,000 | 0.9 | 1.6 × 10$^{12}$ | 2,400 | 920 | −54 | −53 |
| Ref. Exam. | | | | | | | | | | | | | | | | | |
| 1 | 0.8 | 0.1 | 0.1 | 0.155 | 61.22 | 2.82 | 7.04 | 0.44 | 25.89 | 2.59 | 200 | 0.6 | 3 × 10$^9$ | 0.05 | 0.002 | +10 | −8 |
| 2 | 0.05 | 0.9 | 0.05 | 0 | 68.71 | 0.00 | 0.42 | 3.72 | 25.91 | 1.23 | 21,000 | 3.4 | 3.3 × 10$^{11}$ | 620 | 170 | −57 | −48 |
| 3 | 0.1 | 0.1 | 0.8 | 0.4 | 55.33 | 9.27 | 1.12 | 0.56 | 7.32 | 26.41 | 650 | 0.8 | 2 × 10$^9$ | 0.12 | 0.03 | −30 | +68 |

As can be seen from Table 1, the ceramic compositions having a dielectric constant of from 3,000 to 19,000 or above and a dielectric loss of no more than 2.0% according to the present invention can be sintered at low temperature of no more than 1,100° C., for example, from 900° C. to 1,050° C. Further, the insulation resistance is large (at least $10^{12}$ Ω·cm) and the reduction in insulation resistance is extremely small even at elevated temperatures. This is apparent from the fact that the CR product is large (from 800 to 5,000 Ω·F at 125° C.). Furthermore, the temperature characteristics of the dielectric constant are good (within −56% at a temperature of from −30° to +85° C.).

For comparison, Reference Examples will be described.

Reference Example 1 is a comparative example belonging to the region (1) described above. The dielectric constant is small, and thus the composition described in Reference Example 1 is impractical.

Reference Example 2 is a comparative example belonging to the region (5) described above. The CR product is reduced, sintering is insufficient at a temperature of from 900° C. to 1,050° C., and the mechanical strength is weakened.

Reference Example 3 is a comparative example belonging to the region (3) described above. Both the dielectric constant and the CR product are reduced, and thus the composition described in Reference Example 3 is impractical.

EXAMPLES 13 and 14

The ceramic compositions were prepared as in Examples 1 to 12 except that the molar ratio of A to B was varied (Examples 13 and 14 and Reference Example 4). The results are shown in Table 2. Reference Examples wherein Pb was substituted by Ba or Sr rather than Ca are shown in Table 2 as Reference Examples 5 to 8.

TABLE 2

| | Composition (mole) | | | | A/B | PbO (wt %) | CaO (wt %) | ZnO (wt %) | MgO (wt %) | Nb$_2$O$_5$ (wt %) | TiO$_2$ (wt %) | Dielectric Constant K25° | Dielectric Loss DF (%) | Insulation Resistance ρ25° C. (Ω·cm) | CR Product 25° C (Ω·F) | CR Product 125° C. (Ω·F) | Temperature Coefficient of Capacitance (%) | |
|---|---|---|---|---|---|---|---|---|---|---|---|---|---|---|---|---|---|---|
| | x | y | z | a | | | | | | | | | | | | | −30° C. | +85° C. |
| Exam. | | | | | | | | | | | | | | | | | | |
| 13 | 0.3 | 0.5 | 0.2 | (Ca) 0.1 | 1.03 | 65.81 | 1.84 | 2.59 | 2.14 | 22.55 | 5.08 | 13,300 | 1.2 | 2.0 × 10$^{13}$ | 23,600 | 6,600 | −51 | −38 |
| 14 | 0.3 | 0.5 | 0.2 | (Ca) 0.1 | 1.00 | 65.18 | 1.82 | 2.64 | 2.18 | 23.00 | 5.18 | 10,800 | 1.5 | 1.3 × 10$^{13}$ | 12,400 | 3,500 | −53 | −35 |
| Ref. Exam. | | | | | | | | | | | | | | | | | | |
| 4 | 0.3 | 0.5 | 0.2 | (Ca) 0.1 | 0.97 | 64.52 | 1.80 | 2.69 | 2.22 | 23.47 | 5.29 | 7,400 | 3.3 | 7.2 × 10$^{12}$ | 4,700 | 1,300 | −64 | −29 |
| 5 | 0.3 | 0.5 | 0.2 | (Ba) 0.125 | 1.03 | 62.35 | (BaO) 6.12 | 2.52 | 2.08 | 21.97 | 4.95 | 7,200 | 0.7 | 2.0 × 10$^{13}$ | 12,700 | 3,600 | −25 | −25 |
| 6 | 0.3 | 0.5 | 0.2 | (Ba) 0.125 | 1.00 | 61.77 | (BaO) 6.06 | 2.57 | 2.12 | 22.42 | 5.05 | 9,300 | 0.8 | 1.9 × 10$^{13}$ | 15,600 | 4,500 | −32 | −30 |
| 7 | 0.3 | 0.5 | 0.2 | (Sr) 0.1 | 1.03 | 64.81 | (SrO) 3.34 | 2.55 | 2.10 | 22.20 | 5.00 | 7,900 | 0.5 | 2.1 × 10$^{13}$ | 14,700 | 4,400 | −28 | −35 |
| 8 | 0.3 | 0.5 | 0.2 | (Sr) 0.1 | 1.00 | 64.19 | (SrO) 3.31 | 2.60 | 1.15 | 22.65 | 5.11 | 10,500 | 0.6 | 2.0 × 10$^{13}$ | 18,600 | 5,600 | −33 | −38 |

As can be seen from Table 2, when the molar ratio of A to B was $1.0 \leq A/B < 1.10$, good results were obtained wherein the dielectric constant was particularly high and the insulation resistance was high.

Reference Example 4 was one wherein the molar ratio of A to B was 0.97. It is apparent that the dielectric constant is reduced and the dielectric loss is increased.

Further, Reference Examples 5 to 8 show those wherein Pb was substituted by Ba or Sr in place of Ca and the molar ratio of A to B was varied. When the molar ratio of A to B is more than 1, the dielectric constant is reduced. This is a tendency contrary to Ca substitution and is a new discovery which suggests that Ba and Sr cannot be put in the same category with Ca.

EXAMPLES 15 to 26

Examples wherein at least one of MnO, CoO, NiO and $Cr_2O_3$ was incorporated in the composition described in Example 4 are shown in Table 3 as Examples 15 to 26.

Comparative example wherein 2 mole % of MnO was incorporated in the composition described in Example 4 is shown in Table 3 as Reference Example 9.

TABLE 3

| | Composition (mole) | | | | Fundamental Composition (wt %) | | | | | | Additive (mole %) | Dielectric Constant K25° | Dielectric Loss DF (%) | Insulation Resistance ρ25° C. (Ω·cm) | CR Product 25° C. (Ω·F) | CR Product 125° C. (Ω·F) | Temperature Coefficient of Capacitance (%) | |
|---|---|---|---|---|---|---|---|---|---|---|---|---|---|---|---|---|---|---|
| | x | y | z | a | PbO | CaO | ZnO | MgO | Nb$_2$O$_5$ | TiO$_2$ | | | | | | | −30° C. | +85° C. |
| Exam. 4 | 0.34 | 0.33 | 0.33 | 0.20 | 61.75 | 3.88 | 3.19 | 1.53 | 20.53 | 9.12 | 0 | 7,700 | 0.8 | 1.8 × 10$^{12}$ | 12,300 | 3,400 | −54 | −45 |
| 15 | " | " | " | " | " | " | " | " | " | " | (MnO) 0.05 | 7,600 | 0.7 | 1.7 × 10$^{13}$ | 11,000 | 3,000 | −51 | −45 |
| 16 | " | " | " | " | " | " | " | " | " | " | 0.1 | 7,500 | 0.7 | 1.6 × 10$^{12}$ | 10,600 | 2,700 | −54 | −44 |
| 17 | " | " | " | " | " | " | " | " | " | " | 0.2 | 6,800 | 0.5 | 1.4 × 10$^{13}$ | 8,200 | 1,900 | −55 | −42 |
| 18 | " | " | " | " | " | " | " | " | " | " | 0.5 | 6,100 | 0.3 | 1.2 × 10$^{13}$ | 6,500 | 1,400 | −51 | −39 |
| 19 | " | " | " | " | " | " | " | " | " | " | 1.0 | 5,200 | 0.5 | 1.0 × 10$^{13}$ | 4,600 | 1,010 | −45 | −37 |
| Ref. Exam. 9 | 0.34 | 0.33 | 0.33 | 0.20 | 61.75 | 3.88 | 3.19 | 1.53 | 20.53 | 9.12 | 2.0 | 3,900 | 1.1 | 5.1 × 10$^{12}$ | 1,700 | 340 | −31 | −33 |
| Exam. 20 | 0.34 | 0.33 | 0.33 | 0.20 | 61.75 | 3.88 | 3.19 | 1.53 | 20.53 | 9.12 | (CoO) 0.2 | 7,600 | 0.5 | 1.3 × 10$^{13}$ | 8,700 | 2,200 | −55 | −42 |
| 21 | " | " | " | " | " | " | " | " | " | " | 0.5 | 6,300 | 0.3 | 1.3 × 10$^{13}$ | 7,300 | 1,500 | −53 | −40 |
| 22 | " | " | " | " | " | " | " | " | " | " | (NiO) 0.5 | 6,200 | 0.5 | 1.2 × 10$^{13}$ | 6,600 | 1,300 | −54 | −40 |
| 23 | " | " | " | " | " | " | " | " | " | " | (Cr$_2$O$_3$) 0.5 | 6,200 | 0.4 | 1.3 × 10$^{13}$ | 7,100 | 1,400 | −54 | −39 |
| 24 | " | " | " | " | " | " | " | " | " | " | (MnO) 0.25 (CoO) 0.25 | 6,100 | 0.3 | 1.1 × 10$^{13}$ | 5,900 | 1,200 | −52 | −41 |
| 25 | " | " | " | " | " | " | " | " | " | " | (MnO) 0.25 (NiO) 0.25 | 6,200 | 0.3 | 1.2 × 10$^{13}$ | 6,600 | 1,300 | −51 | −40 |
| 26 | " | " | " | " | " | " | " | " | " | " | (MnO) 0.25 (Cr$_2$O$_3$) 0.25 | 6,000 | 0.4 | 1.3 × 10$^{13}$ | 6,900 | 1,500 | −50 | −39 |

As can be seen from Table 3, the incorporation of at least one of manganese, cobalt, nickel and chromium in an amount of up to 1 mole % (on the basis of their oxides) in the ceramic compositions of the present invention can reduce the dielectric loss, improve sinterability and provide good characteristics. However, it is apparent from Reference Example 9 that the addition of more than 1% of such an additive is undesirable because this leads to an extreme reduction in dielectric constant and reduction in insulation resistance particularly at elevated temperatures.

EXAMPLE 27

A disk-like formed specimen having a diameter of 17 mm and a thickness of about 2 mm was formed as in Example 1-12. This disk was heated to a temperature of 500° C. to burn out the binder and sintered for 15 minutes in a nitrogen atmosphere having a partial pressure of oxygen of $1.0 \times 10^{-5}$ atm at a temperature of 900° C. Gold electrodes were deposited on the main surfaces of the sintered specimen. Its characteristics were measured as in Examples 1 to 12.

For the composition wherein $x=0.3$, $y=0.5$, $z=0.2$, $a=0.1$, $A/B=1.03$ and $MnO=0.1$ mole %, the following characteristics were obtained.

| | |
|---|---|
| Dielectric Constant K 25° C. | 6,200 |
| Dielectric Loss | 1.9% |
| Insulation Resistance | $\rho_{25° C.}$ $1.1 \times 10^{13}$ $\Omega \cdot$ cm |
| CR Product at 25° C. | 6,000 $\Omega \cdot$ F |
| Temperature Coefficient | at −30° C. −39% |
| of capacitance | at +85° C. −31% |

Further, Cu powder was simultaneously placed on the alumina substrate during the sintering step and placed in a furnace. The resulting product had a gloss of Cu metal powder after sintering.

Thus, according to the present invention, it is possible to satisfactorily sinter in an atmosphere having a low partial pressure of oxygen.

EXAMPLES 28 to 39

Starting materials such as oxides of Pb, Ca, Zn, Nb, Ti and Mg were mixed by means of a ball mill or the like. The mixtures were calcined at a temperature of from 700° C. to 850° C. in ordinary air. The calcined materials were then milled by means of the ball mill or the like to prepare powder. A binder was added to the powder. The mixtures were granulated and pressed to form disk-like specimens each having a diameter of 17 mm and a thickness of about 2 mm.

The binder was burnt for 4 hours in air at a temperature of 500° C. and thereafter the disk specimen was sintered for one hour in a nitrogen atmosphere having a partial pressure of oxygen of about $10^{-8}$ to $10^{-9}$ atm at a temperature of 950° C. Aluminum electrodes were formed on the main surfaces of the sintered specimens by vacuum evaportion to measure dielectric and electrical properties. Their dielectric loss and capacitance were measured by using a digital LCR meter under 1 KHz and 1 Vrms at 25° C. Their dielectric constant was calculated from the data of the size of the specimen and the capacitance measured. Further, their insulation resistance values were calculated from the data measured by applying a voltage of 100 V for 2 minutes by using an insulation resistance meter. The temperature coefficient of capacitance was determined by using a value at 25° C. as a standard and examining the percent change at −30° C. and 85° C., respectively. Capacitance-resistance product was determined from (dielectric constant) x (insulation resistance) x (dielectric constant in vacuo) at 25° C. and 125° C., respectively. The measurement of insulation resistance was carried out in silicone oil in order to exclude the effect of moisture in air. The results are shown in Table 4.

TABLE 4

| | Composition (mole) | | | | PbO (wt %) | CaO (wt %) | ZnO (wt %) | MgO (wt %) | Nb$_2$O$_5$ (wt %) | TiO$_2$ (wt %) | Dielectric Constant K25° C. | Dielectric Loss DF (%) | Insulation Resistance ρ25° C. (Ω·cm) | CR Product 25° C. (Ω·F) | CR Product 125° C. (Ω·F) | Temperature Coefficient of Capacitance (%) | |
|---|---|---|---|---|---|---|---|---|---|---|---|---|---|---|---|---|---|
| | x | y | z | a | | | | | | | | | | | | −30° C. | +85° C. |
| Exam. | | | | | | | | | | | | | | | | | |
| 28 | 0.54 | 0.44 | 0.02 | 0.075 | 64.59 | 1.32 | 4.58 | 1.85 | 27.16 | 0.50 | 5,200 | 0.9 | 7.5 × 10$^{12}$ | 3,500 | 1,040 | −53 | −40 |
| 29 | 0.5 | 0.3 | 0.2 | 0.16 | 62.30 | 2.98 | 4.51 | 1.34 | 23.56 | 5.31 | 5,500 | 0.8 | 9.9 × 10$^{12}$ | 4,800 | 2,200 | −51 | −38 |
| 30 | 0.5 | 0.1 | 0.4 | 0.26 | 59.03 | 5.21 | 4.85 | 0.48 | 19.00 | 11.42 | 3,050 | 0.8 | 1.3 × 10$^{13}$ | 3,500 | 1,200 | −51 | −38 |
| 31 | 0.34 | 0.33 | 0.33 | 0.20 | 61.75 | 3.88 | 3.19 | 1.53 | 20.53 | 9.12 | 7,500 | 0.9 | 1.5 × 10$^{13}$ | 10,000 | 3,300 | −54 | −44 |
| 32 | 0.1 | 0.4 | 0.5 | 0.245 | 61.37 | 5.00 | 0.99 | 1.96 | 16.13 | 14.55 | 13,800 | 1.0 | 8.5 × 10$^{12}$ | 10,400 | 3,600 | −53 | −46 |
| 33 | 0.1 | 0.5 | 0.4 | 0.195 | 63.01 | 3.83 | 0.95 | 2.36 | 18.64 | 11.21 | 15,100 | 1.0 | 1.2 × 10$^{13}$ | 16,000 | 5,400 | −54 | −46 |
| 34 | 0.01 | 0.7 | 0.29 | 0.125 | 65.52 | 2.35 | 0.09 | 3.16 | 21.11 | 7.77 | 18,900 | 1.0 | 8.0 × 10$^{12}$ | 13,400 | 3,800 | −55 | −45 |
| 35 | 0.1 | 0.7 | 0.2 | 0.09 | 66.13 | 1.64 | 0.88 | 3.06 | 23.08 | 5.20 | 16,000 | 1.1 | 9.5 × 10$^{12}$ | 13,500 | 4,000 | −52 | −47 |
| 36 | 0.3 | 0.5 | 0.2 | 0.125 | 64.24 | 2.31 | 2.68 | 2.21 | 23.32 | 5.26 | 9,500 | 0.9 | 1.5 × 10$^{13}$ | 12,600 | 4,700 | −54 | −46 |
| 37 | 0.3 | 0.6 | 0.1 | 0.075 | 65.63 | 1.34 | 2.59 | 2.56 | 25.35 | 2.54 | 10,000 | 0.9 | 1.3 × 10$^{13}$ | 11,500 | 5,200 | −53 | −47 |
| 38 | 0.3 | 0.7 | 0 | 0.025 | 66.92 | 0.43 | 2.50 | 2.89 | 27.25 | 0.00 | 10,500 | 0.9 | 4.8 × 10$^{12}$ | 4,500 | 960 | −51 | −44 |
| 39 | 0.1 | 0.8 | 0.1 | 0.04 | 67.44 | 0.71 | 0.85 | 3.38 | 25.10 | 2.51 | 16,700 | 1.1 | 1.4 × 10$^{12}$ | 2,100 | 910 | −54 | −52 |
| Ref. Exam. | | | | | | | | | | | | | | | | | |
| 10 | 0.8 | 0.1 | 0.1 | 0.155 | 61.22 | 2.82 | 7.04 | 0.44 | 25.89 | 2.59 | 190 | 0.8 | 1.7 × 10$^9$ | 0.03 | 0.002 | +9 | −10 |
| 11 | 0.05 | 0.9 | 0.05 | 0 | 68.71 | 0.00 | 0.42 | 3.72 | 25.91 | 1.23 | 20,000 | 4.2 | 1.5 × 10$^{11}$ | 270 | 150 | −57 | −49 |
| 12 | 0.1 | 0.1 | 0.8 | 0.4 | 55.33 | 9.27 | 1.12 | 0.56 | 7.32 | 26.41 | 620 | 0.9 | 2 × 10$^9$ | 0.11 | 0.03 | −30 | +65 |

As can be seen from Table 4, the ceramic compositions of the present invention can be satisfactorily sintered in an atmosphere having a low partial pressure of oxygen, and characteristics as good as those obtained by sintering in air (Table 1) can be obtained. Reference Examples 10, 11 and 12 correspond to Reference Examples 1, 2 and 3 in which sintering was carried out in air. All of the ceramic compositions described in Reference Examples 10, 11 and 12 are impractical for the same reasons as given in Reference Examples 1, 2 and 3.

EXAMPLES 40 and 41

The ceramic compositions of Reference Examples 40 and 41 and Reference Example 13 were prepared as in Examples 28 to 39 except that the molar ratio of A to B was varied. The results are shown in Table 5. Reference Examples wherein Pb was substituted by Ba or Sr rather than Ca are shown in Table 5 as Reference Examples 14 to 17.

TABLE 5

| | Composition (mole) | | | | A/B | PbO (wt %) | CaO (wt %) | ZnO (wt %) | MgO (wt %) | Nb$_2$O$_5$ (wt %) | TiO$_2$ (wt %) | Dielectric Constant K25° C. | Dielectric Loss DF (%) | Insulation Resistance ρ25° C. (Ω·cm) | CR Product 25° C. (Ω·F) | CR Product 125° C. (Ω·F) | Temperature Coefficient of Capacitance (%) | |
|---|---|---|---|---|---|---|---|---|---|---|---|---|---|---|---|---|---|---|
| | x | y | z | a | | | | | | | | | | | | | −30° C. | +85° C. |
| Exam. | | | | | | | | | | | | | | | | | | |
| 40 | 0.3 | 0.5 | 0.2 | (Ca) 0.1 | 1.03 | 65.81 | 1.84 | 2.59 | 2.14 | 22.55 | 5.08 | 13,300 | 1.2 | 1.8 × 10$^{13}$ | 21,200 | 6,400 | −51 | −37 |
| 41 | 0.3 | 0.5 | 0.2 | (Ca) 0.1 | 1.00 | 65.18 | 1.82 | 2.64 | 2.18 | 23.00 | 5.18 | 10,400 | 1.6 | 1.2 × 10$^{13}$ | 11,000 | 3,200 | −52 | −33 |
| Ref. Exam. | | | | | | | | | | | | | | | | | | |
| 13 | 0.3 | 0.5 | 0.2 | (Ca) 0.1 | 0.97 | 64.52 | 1.80 | 2.69 | 2.22 | 23.47 | 5.29 | 6,500 | 3.5 | 3.8 × 10$^{12}$ | 2,190 | 1,100 | −63 | −28 |
| 14 | 0.3 | 0.5 | 0.2 | (Ba) 0.125 | 1.03 | 62.35 | (BaO) 6.12 | 2.52 | 2.08 | 21.97 | 4.95 | 2,300 | 3.1 | 6.1 × 10$^{10}$ | 12 | — | −19 | −19 |
| 15 | 0.3 | 0.5 | 0.2 | (Ba) 0.125 | 1.00 | 61.77 | (BaO) 6.06 | 2.57 | 2.12 | 22.42 | 5.05 | 4,200 | 4.2 | 5.8 × 10$^{10}$ | 22 | — | −22 | −21 |
| 16 | 0.3 | 0.5 | 0.2 | (Sr) 0.1 | 1.03 | 64.81 | (SrO) 3.34 | 2.55 | 2.10 | 22.20 | 5.00 | 3,500 | 3.0 | 8.3 × 10$^{10}$ | 26 | — | −21 | −24 |
| 17 | 0.3 | 0.5 | 0.2 | (Sr) 0.1 | 1.00 | 64.19 | (SrO) 3.31 | 2.60 | 2.15 | 22.65 | 5.11 | 5,100 | 3.5 | 7.9 × 10$^{10}$ | 36 | — | −23 | −27 |

As can be seen from Table 5, when the molar ratio of A to B was $1.00 \leq A/B < 1.10$, good results were obtained wherein the dielectric constant was particularly high and the insulation resistance was high.

Reference Example 13 was one wherein the molar ratio of A to B was 0.97. It is apparent that the dielectric constant is reduced and the dielectric loss is increased.

Further, Reference Examples 14 to 17 show those wherein Pb was substituted by Ba or Sr in place of Ca. It is apparent that the dielectric constants and insulation resistances of the compositions substituted by Ba or Sr are remarkably reduced as compared with those of the compositions substituted by Ca.

EXAMPLES 42 to 53

Examples wherein at least one of MnO, CoO, NiO and $Cr_2O_3$ was incorporated in the composition described in Example 31 are shown in Table 6 as Examples 42 to 53.

Comparative example wherein 2 mole % of MnO was incorporated in the composition described in Example 31 is shown in Table 6 as Reference Example 18.

TABLE 6

| | Composition (mole) | | | | Fundamental Composition (wt %) | | | | | | Additive (mole %) | Dielectric Constant K25° | Dielectric Loss DF (%) | Insulation Resistance ρ25° C. (Ω·cm) | CR Product 25° C. (Ω·F.) | CR Product 125° C. (Ω·F.) | Temperature Coefficient of Capacitance (%) | |
|---|---|---|---|---|---|---|---|---|---|---|---|---|---|---|---|---|---|---|
| | x | y | z | a | PbO | CaO | ZnO | MgO | Nb$_2$O$_5$ | TiO$_2$ | | | | | | | −30° C. | +85° C. |
| Exam. | | | | | | | | | | | | | | | | | | |
| 31 | 0.34 | 0.33 | 0.33 | 0.20 | 61.75 | 3.88 | 3.19 | 1.53 | 20.53 | 9.12 | 0 | 7,500 | 0.9 | 1.5 × 10$^{13}$ | 10,000 | 3,300 | −54 | −44 |
| 42 | " | " | " | " | " | " | " | " | " | " | (MnO) 0.05 | 7,400 | 0.8 | 1.5 × 10$^{13}$ | 9,800 | 2,900 | −50 | −44 |
| 43 | " | " | " | " | " | " | " | " | " | " | 0.1 | 7,300 | 0.8 | 1.4 × 10$^{13}$ | 9,050 | 2,600 | −54 | −43 |
| 44 | " | " | " | " | " | " | " | " | " | " | 0.2 | 6,600 | 0.6 | 1.3 × 10$^{13}$ | 7,600 | 1,800 | −54 | −41 |
| 45 | " | " | " | " | " | " | " | " | " | " | 0.5 | 6,000 | 0.4 | 1.1 × 10$^{13}$ | 5,800 | 1,300 | −51 | −40 |
| 46 | " | " | " | " | " | " | " | " | " | " | 1.0 | 5,100 | 0.7 | 9.8 × 10$^{12}$ | 4,400 | 980 | −45 | −38 |
| Ref. Exam. 18 | 0.34 | 0.33 | 0.33 | 0.20 | 61.75 | 3.88 | 3.19 | 1.53 | 20.53 | 9.12 | 2.0 | 3,800 | 1.3 | 5.0 × 10$^{11}$ | 170 | 120 | −31 | −34 |
| Exam. | | | | | | | | | | | | | | | | | | |
| 47 | 0.34 | 0.33 | 0.33 | 0.20 | 61.75 | 3.88 | 3.19 | 1.53 | 20.53 | 9.12 | (CoO) 0.2 | 6,600 | 0.6 | 1.4 × 10$^{13}$ | 8,200 | 2,100 | −54 | −41 |
| 48 | " | " | " | " | " | " | " | " | " | " | 0.5 | 6,100 | 0.4 | 1.3 × 10$^{13}$ | 7,000 | 1,400 | −53 | −39 |
| 49 | " | " | " | " | " | " | " | " | " | " | (NiO) 0.5 | 6,100 | 0.6 | 1.2 × 10$^{13}$ | 6,500 | 1,200 | −53 | −39 |
| 50 | " | " | " | " | " | " | " | " | " | " | (Cr$_2$O$_3$) 0.5 | 6,000 | 0.5 | 1.2 × 10$^{13}$ | 6,400 | 1,200 | −54 | −38 |
| 51 | " | " | " | " | " | " | " | " | " | " | (MnO) 0.25 (CoO) 0.25 | 6,000 | 0.4 | 1.0 × 10$^{13}$ | 5,300 | 950 | −51 | −40 |
| 52 | " | " | " | " | " | " | " | " | " | " | (MnO) 0.25 (NiO) 0.25 | 6,100 | 0.4 | 1.1 × 10$^{13}$ | 5,900 | 1,100 | −50 | −39 |
| 53 | " | " | " | " | " | " | " | " | " | " | (MnO) 0.25 (Cr$_2$O$_3$) 0.25 | 5,800 | 0.6 | 1.2 × 10$^{13}$ | 6,200 | 1,200 | −50 | −38 |

As can be seen from Table 6, the present ceramic composition containing at least one of manganese, cobalt, nickel and chromium in an amount of up to 1 mole % (on the basis of their oxides) can be sintered in an atmosphere having a low partial pressure of oxygen. Characteristics as good as those obtained by sintering in air (Table 3) can be obtained.

Reference Example 18 is one wherein 2 mole % of MnO was used. The ceramic composition described in Reference Example 18 is undesirable because it leads to reduction in insulation resistance.

EXAMPLES 54 and 55

By using a composition wherein x=0.3, y=0.5, z=0.2, a=0.1, A/B=1.03 and MnO=0.1 mole % (Example 54) and a composition wherein x=0.5, y=0.3, z=0.2, a=0.16, A/B=1.01 and MnO=0.1 mole % (Example 55) as dielectrics, multilayer ceramic capacitors were fabricated in the following manner.

Dielectric powder was produced by a conventional process for producing ceramics. Calcination was carried out for 2 hours at a temperature of 850° C. The calcined and pulverized powder was mixed with an organic binder and a solvent. The mixture was formed into ceramic green sheets each having a thickness of 50 micrometers by a casting method wherein a doctor blade was used. A paste for an internal electrode comprising copper or copper-nickel alloy powder, an organic binder and a solvent was printed on the sheets. The sheets were laminated so that electrodes would be alternately drawn. The laminated sheets were cut into green chips. 0.5% $O_2$-$N_2$ gas was passed through these laminated green chips, and the chips were heated to a temperature of 420° C. to remove the binder.

The binder-removed green chips were sintered for one hour in a nitrogen atmosphere having a partial pressure of oxygen of from $10^{-8}$ to $10^{-9}$ atm at a temperature of 950° C. In place of said nitrogen atmosphere, an inert gas atmosphere such as argon can be also used. By printing a copper paste containing an inorganic binder onto the both terminals of the green chips to provide external electrodes and by sintering in the atmosphere described above at a temperature of 700° C., the sintered multilayer capacitor element was produced.

The shape of the multilayer ceramic capacitor element was $7 \times 5 \times 1$ (mm$^3$); the effective area of the electrode was $4.2 \times 5.0$ (mm$^2$); the effective number of the layers was 20 and the thickness of the dielectric was about 35 micrometers.

The characteristics obtained are shown in Table 7.

TABLE 7

| Internal electrode | Example 54 Cu | Example 55 Cu:Ni = 40:60 alloy |
|---|---|---|
| Capacitance (μF) | 1.3 | 0.56 |
| Dielectric loss (%) | 1.5 | 1.8 |
| Resistance (Ω) | 5.5 × 10⁹ | 4.3 × 10⁹ |
| CR Product (Ω · F) | 7,200 | 2,400 |

Thus, according to the present invention, it is possible to satisfactorily sinter the ceramic compositions even in an atmosphere having a low partial pressure of oxygen, for example, in an atmosphere having a partial pressure of oxygen of about $10^{-4}$ to $10^{-10}$.

We claim:

1. A high dielectric constant ceramic composition, characterized in that said composition is represented by the general formula:

$xPb(Zn_{\frac{1}{3}}Nb_{\frac{2}{3}})O_3—$ $yPb(Mg_{\frac{1}{3}}Nb_{\frac{2}{3}})O_3 —zPbTiO_3,$ wherein a portion of Pb of the composition within lines connecting the following points a, b, c, d, e′ and f′ of a ternary composition diagram having the following apexes of respective components, is substituted by from 2 to 30 mole % of calcium:

| a: | (x = 0.60, | y = 0.40, | z = 0.00) |
|---|---|---|---|
| b: | (x = 0.60, | y = 0.05, | z = 0.35) |
| c: | (x = 0.45, | y = 0.05, | z = 0.50) |
| d: | (x = 0.01, | y = 0.49, | z = 0.50) |
| e′ | (x = 0.01, | y = 0.8, | z = 0.19) |
| f′ | (x = 0.5, | y = 0.5, | z = 0). |

2. The high dielectric constant ceramic composition according to claim 1, wherein when lead and calcium elements are represented by A, further zinc, magnesium, niobium and titanium elements are represented by B and the chemical formula of the complex compound is represented by ABO₃, the molar ratio of A to B is in the range shown in the formula:

$1.00 \leq A/B < 1.10$

3. The high dielectric constant ceramic composition according to claim 1 which further comprises at least one of manganese, cobalt, nickel and chromium which is additionally included therein in an amount of up to 1.0 mole % on the basis of MnO, CoO, NiO and Cr₂O₃.

4. The high dielectric constant ceramic composition according to claim 1, wherein b is b′ (x=0.6, y=0.2, and z=0.2), and c is c′ ((x=0.3, y=0.2, and z=0.5).

5. The high dielectric constant ceramic composition according to claim 1, wherein z is at least 0.01.

6. A multilayer ceramic capacitor having at least a pair of internal electrodes, said capacitor being produced using the high dielectric constant ceramic composition according to claim 1 as a dielectric.

7. The capacitor according to claim 6, wherein the electrodes are formed from a low melting metal selected from the group consisting of silver, copper, nickel and aluminum.

8. The high dielectric constant ceramic composition according to claim 2, which further comprises at least one of manganese, cobalt, nickel and chromium which is additionally included therein in an amount of up to 1.0 mole % on the basis of MnO, CoO, NiO and Cr₂O₃.

9. The high dielectric constant ceramic composition according to claim 3, which further comprises at least one of manganese, cobalt, nickel and chromium which is additionally included therein in an amount of up to 1.0 mole % on the basis of MnO, CoO, NiO and Cr₂O₃.

10. The high dielectric constant ceramic composition according to claim 4, which further comprises at least one of manganese, cobalt, nickel and chromium which is additionally included therein in an amount of up to 1.0 mole % on the basis of MnO, CoO, NiO and Cr₂O₃.

11. The high dielectric constant ceramic composition according to claim 5, which further comprises at least one of manganese, cobalt, nickel and chromium which is additionally included therein in an amount of up to 1.0 mole % on the basis of MnO, CoO, NiO and Cr₂O₃.

* * * * *